(12) United States Patent
Rees (10) Patent No.: US 6,401,907 B1
(45) Date of Patent: Jun. 11, 2002

(54) CONVEYOR

(75) Inventor: Daniel Rees, Zurich (CH)

(73) Assignee: Inmara AG, Pfaffikon (CH)

( * ) Notice: Subject to any disclaimer, the term of this patent is extended or adjusted under 35 U.S.C. 154(b) by 0 days.

(21) Appl. No.: 09/622,262

(22) PCT Filed: Jan. 25, 1999

(86) PCT No.: PCT/CH99/00031

§ 371 (c)(1),
(2), (4) Date: Aug. 21, 2000

(87) PCT Pub. No.: WO99/41168

PCT Pub. Date: Aug. 19, 1999

(30) Foreign Application Priority Data

Feb. 13, 1998 (CH) .................................................. 356/98

(51) Int. Cl.[7] ........................... B65G 47/26; B65G 21/08
(52) U.S. Cl. ................................. 198/457.06; 198/861.1
(58) Field of Search ............................ 198/457.06, 861.1

(56) References Cited

U.S. PATENT DOCUMENTS

| | | | | |
|---|---|---|---|---|
| 3,294,215 A | | 12/1966 | Walter | |
| 3,701,407 A | * | 10/1972 | Kulig | 198/20 |
| 4,007,827 A | * | 2/1977 | Mattos | 198/862 |
| 5,033,605 A | * | 7/1991 | Marquart | 198/300 |
| 5,178,263 A | * | 1/1993 | Kempen | 198/836.1 |
| 5,692,594 A | | 12/1997 | Sidler | |
| 6,012,568 A | * | 1/2000 | Kane | 198/817 |

* cited by examiner

Primary Examiner—Joseph D. Pape
Assistant Examiner—Gregory Blankenship
(74) Attorney, Agent, or Firm—Edwin D. Schindler (57) ABSTRACT

A conveying apparatus for workpieces during a manufacturing procedure has a fixed guide track and a guide track having a variable geometry. The variable guide track includes a plurality of sections movable relative to the fixed guide track. The displacement of the movable sections of the variable guide track alters the distance between carriers arranged on a continuous conveyor chain in the region in which workpieces are transferred from a feed belt to a discharge belt.

10 Claims, 10 Drawing Sheets

CONVEYOR

BACKGROUND OF THE INVENTION

1. Technical Field of the Invention

The present invention relates, generally, to a conveying apparatus.

More particularly, the present invention relates to a conveying apparatus having a fixed guide track and a guide track with a variable geometry. The variable guide track comprises several sections which are movable relative to the fixed guide track. The displacement of various sections of the variable guide track alters the distance between carriers arranged on a revolving chain in an area in which workpieces are transferred from a feed belt to a discharge belt.

In many areas of mass production, it is necessary to link machines with one another which carry out processing work on the articles to be manufactured. Both the processing speed and the distance between the products, that are consecutively being taken to the next processing station, may vary. Most processing machines require that the workpieces be supplied at regular (i.e., consistently equivalent) distances. These required distances may be smaller or greater than the distances between the arriving workpieces.

2. Description of the Prior Art

German Patent Document No. 195 10 649 discloses a conveying apparatus, in which a link chain is guided around three direction-changing wheels, of which one of the direction-changing wheels is supported in an elastically shiftable manner, for the purpose of tensioning the chain and compensating for differences in length. Between the two fixed direction-changing wheels, the chain is temporarily shortened by means of a zigzag-shaped pulling apart of the chain links. In the remaining regions (i.e., in the two strands between the fixed direction-changing wheels and the movable one), the chain runs in a tensioned condition (i.e., the pusher element links on every second articulated link of the chain.) In order to reduce the distance in the transfer region of the workpieces which are to be conveyed, the link axles between those that support the pusher elements are deflected from the curved track, which supports these link axles. The differing chain lengths which result from this deflection, and from the changes in the deflection, are absorbed by the third, elastically supported, direction-changing wheel.

In a further embodiment of the prior art apparatus, a deflection curve takes the place of the third, elastically supported direction-changing wheel; that deflecting curve is elastically adjustable and absorbs the changes in length.

The conveying apparatus of German Patent Document No. 195 10 649 fulfills the requirements imposed upon it, with regard to bringing the conveyed workpieces to a condition of equal distances. However, at high conveying velocities, this prior art installation tends to vibrate, a fact which causes loud noise and increased wear.

SUMMARY OF THE INVENTION

It is, therefore, an object of the present invention to provide a conveying apparatus, of the type having a link chain for processing work on articles in a manufacturing process, which will substantially reduce, if not eliminate, the disadvantages inherent in prior art conveying apparatus, such disadvantages including vibrations in the link chain in the region where the pusher elements are brought together.

The foregoing and related objects are achieved by the conveying apparatus of the present invention, which includes a fixed, closed-onto-itself guide track for a continuous conveyor chain with pusher elements, with the distances between the pusher elements along the fixed guide track being adjustable. The fixed guide track includes guided guide rollers on supporting axles for the pusher elements. A variably curved guide track guides intermediate axles with steering rollers and a drive wheel for driving the conveyor chain. The variable guide track further comprises a plurality of swingable, or shiftable, track sections and a first, fixed track section that envelops the drive wheel. The ends of the swingable, or shiftable, track sections are connected to each other and, via articulations, are connected with the stationary, or fixed, track section in an articulated manner via further articulations, with the entirety fixed, or stationary track section, along with the swingable, or shiftable, track sections, making up the closed, variable guide track.

By eliminating the non-driving, direction-changing wheels and by dividing the curved track (which guides the intermediate, non-pusher-carrying link axles) into a plurality of curved sections linked to one another in the articulated manner, the noise level of the conveying apparatus of the present invention is abated and the guidance of the link-chain axles, which carry the pushers, is simplified.

BRIEF DESCRIPTION OF THE DRAWING FIGURES

In the drawing, wherein similar reference numerals denote similar features throughout the several views.

DETAILED DESCRIPTION OF THE DRAWING FIGURES AND PREFERRED EMBODIMENTS

Figure 1:
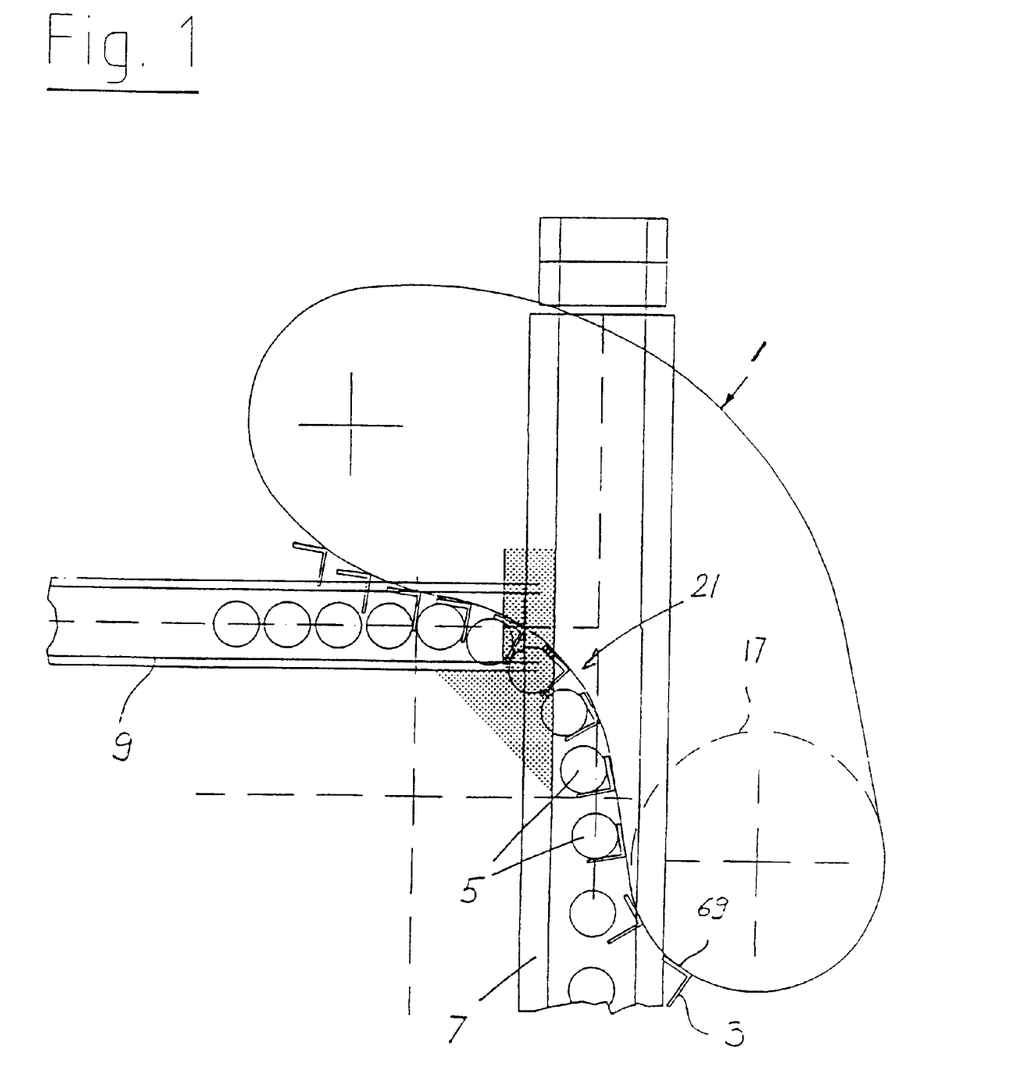
FIG. 1 is a schematic representation of the conveying apparatus of the present invention with a feeding belt and an off-taking belt, as well as the arc-shaped region for equalizing the distances between workpieces.

Turning now, in detail, to an analysis of the accompanying drawing figures, in FIG. 1, reference numeral 1 represents the trajectory of a solid, linear guide track, along which are guided pushers 3 (which may be L-shaped), which pushers 3 transfer workpieces 5 from a feeding belt 7 onto an off-taking belt 9 and which, during said transfer, change the distance between workpieces 5 (which can arrive on the feed belt 7 at irregular distances) to a previously determined uniform value. The fixed guide track 1 (which in FIG. 1 is shown as a solid line) represents two opposite grooves 8, 10, which are sunk into a bottom plate 12 and into a cover plate 14 of the apparatus.

The two grooves 8, 10 in bottom plate 12 and cover plate 14 are rigid and unchangeable. Between the two grooves 8, 10 there lies an additional variable guide track 11 (which in the Example described comprises five sections and is designed as a double, variable-shaped groove); the variable guide track (or curved track) 11 serves, and is designed, to guide the intermediate axles 13, which lie between the axles 67 that carry pusher elements 3. The variable guide track 11 comprises a first track section 15, in the form of a circular arc, which halfway envelops (i.e., about 180°) a drive wheel 17. A second arc-shaped track section 21 is connected to the first track section 15, being linked to the latter via an articulation 19 with a vertical axle. This arc-shaped track section 21 extends over the region where the workpieces 5 are transferred from feed belt 7 to off-taking belt 9. A third track section 23 connects to the second track section 21. Once again, the third track section 23 is linked to the second track section 21 via an articulated connection 25, and is connected to a fourth track section 29 via an articulated connection 27.

The variable guide track 11 is closed by a fifth track section 31, which connects with the fourth track section 29, via an articulation 33, and is attached to said first track section 15 via articulation 35. Inserted into said fifth track section 31 is, preferably, a sliding region 37 which is capable of absorbing changes in length resulting during the deflection and during the changes in the form of variable guide track 11. The third track section 23 comprises two suspension straps 39, 41, into which are cut slit-shaped recesses 43, 45. The two recesses 43, 45 are penetrated by screws or guide pins 47, 49, which hold the third track section 23 in a predetermined position.

Figure 2:
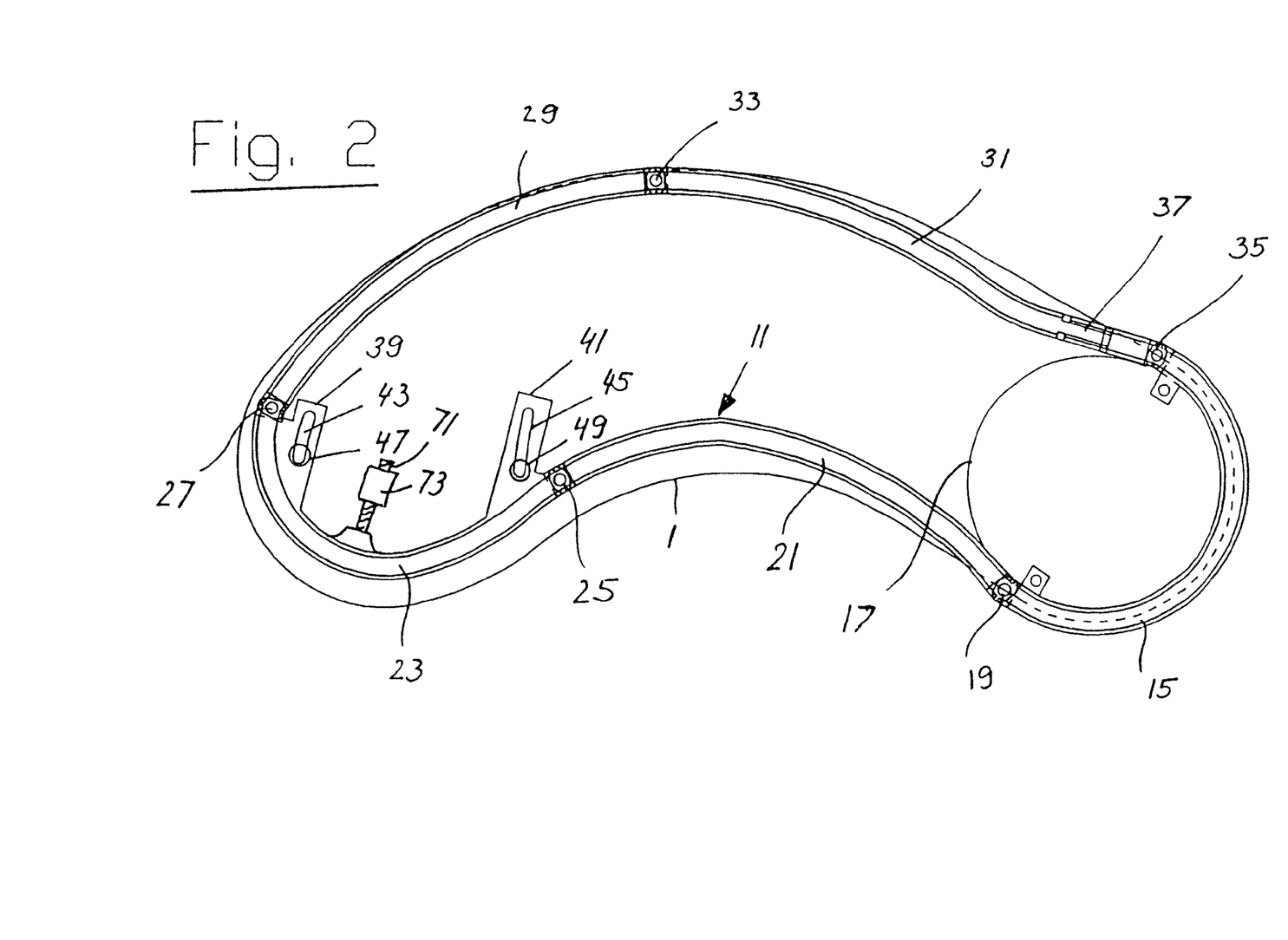
FIG. 2 is a top view of the track-section track in position for small distances between various workpieces.

In FIG. 2, the third track section 23 lies in the first extreme position (i.e., the third track section 23 is pushed all the way against the inside of the curve; upwards in FIG. 2); the screws 47, 49 abut against the lower end of the slit-shaped recesses 43, 45. In this position, the second track section 21 is also swung upwardly to its maximum extent in a clockwise direction, around articulation 19. The same is true for the fifth track section 31, which is swung into the extreme position in a clockwise direction around articulation 35. By way of movement of translation, the fourth track section 29 is pushed in an essentially parallel direction backwards (in the upward direction, as illustrated in FIG. 2.)

Figure 3:
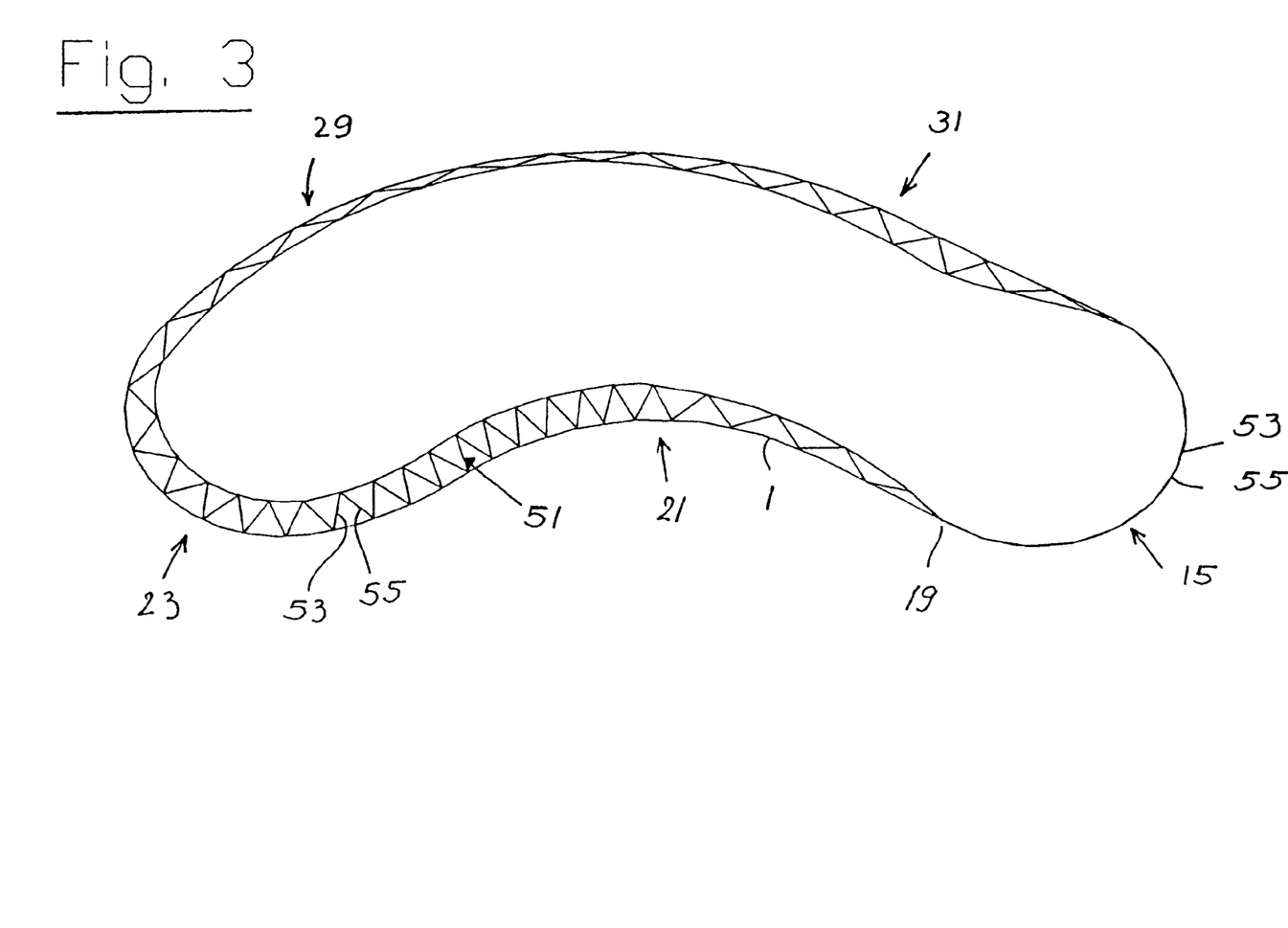
FIG. 3 is a top view on the position of the conveying chain in FIG. 2.

This results in the following layout of a link chain 51, which is made up of a multiplicity of chain links 53, 55, which are linked to one another, as shown in FIG. 3. In the first track section 15, the chain links 53, 55 lie in a fully stretched position on drive wheel 17. Starting at articulation point 19, the variable guide track 11 successively deviates from the fixed guide track 1; link chain 51 assumes a zigzag shape in which the angles between the individual chain links 53, 55 are increasingly reduced until, at articulation point 25, at the transition to the third track section 23, the stretching of chain 51 increases again, because variable guide track 11 again approaches fixed guide track 1. The transfer of workpiece 5 to off-take belt 9 occurs at approximately articulation point 25. In fourth track section 29 and fifth track section 31, chain 51 is further stretched until it reaches complete stretching at the entry to first track section 15, where it starts to run on drive wheel 17. The extreme position of second track section 21 in FIGS. 1 and 2 makes it possible to convey workpieces 5 at the smallest possible distance from each other.

Figure 4:
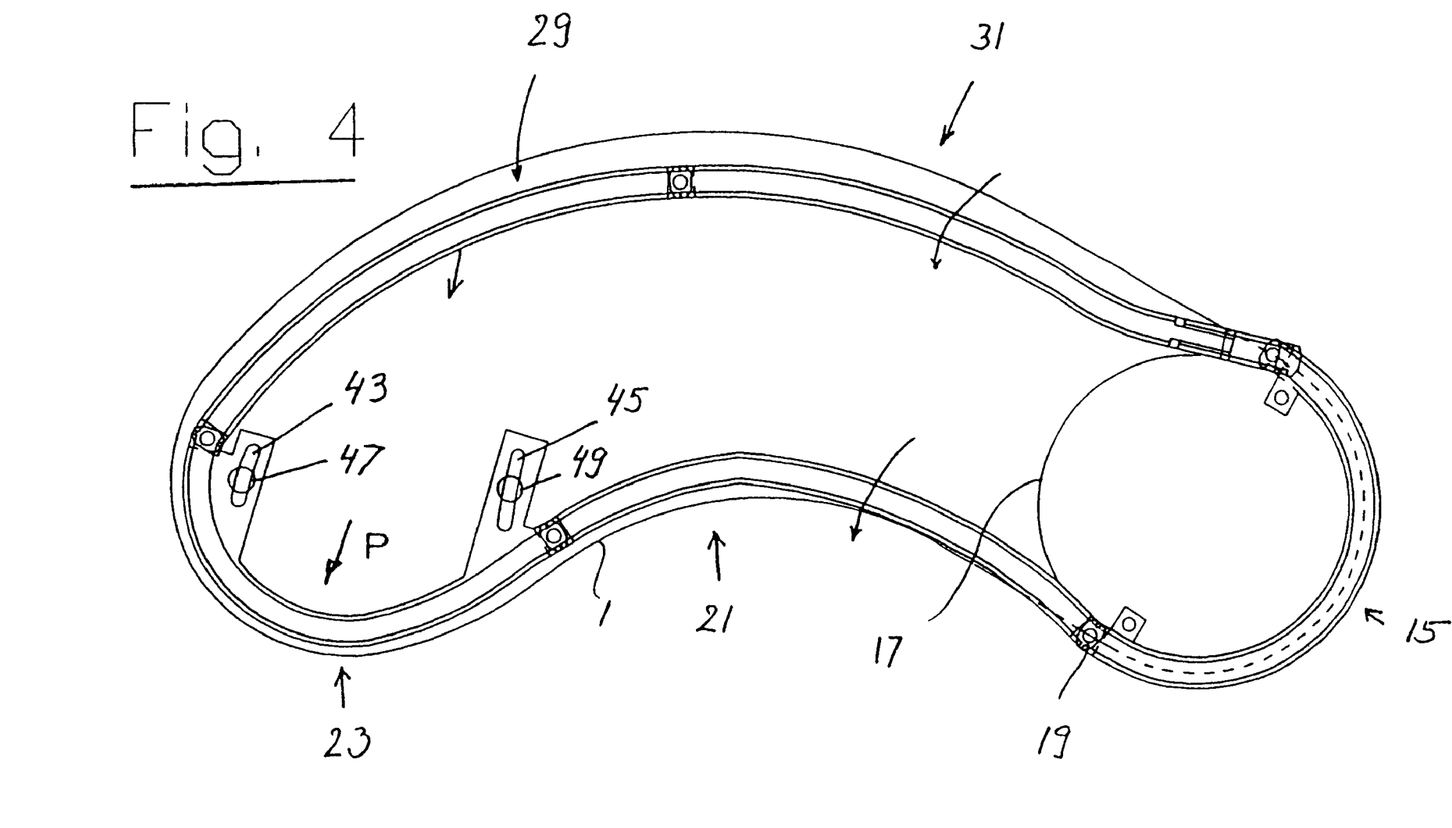
FIG. 4 is a top view of the curved, or variable, guide tracks in the case of intermediate distances between the workpieces.
Figure 5:
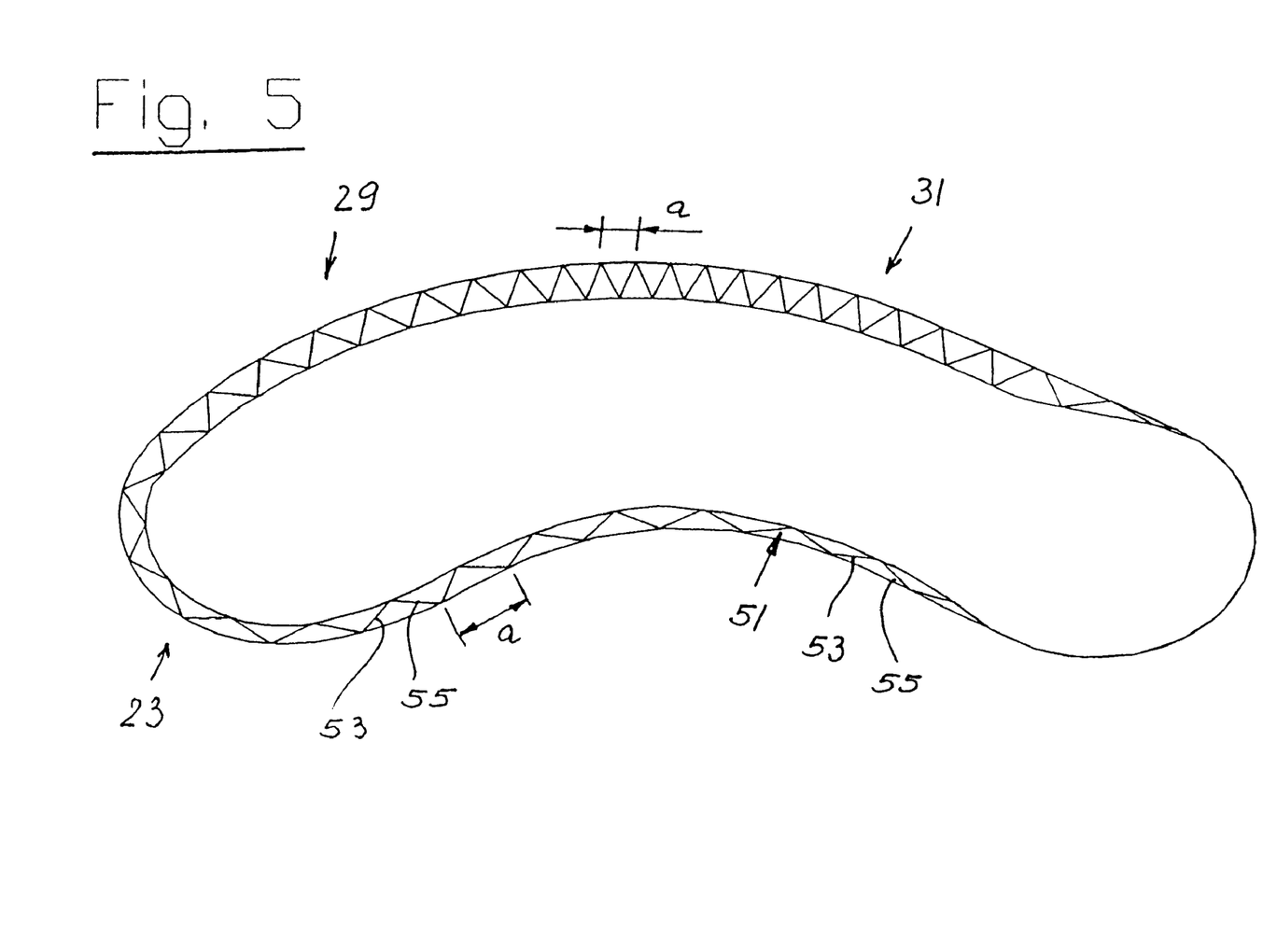
FIG. 5 is a top view on the position of the conveying chain in FIG. 4.

In FIGS. 4 and 5, the distance between the guide tracks 8, 10, 11 is continuously reduced in second track section 21. The change in distance between workpieces 5 is carried out as explained below. By shifting third track section 23 in the direction of arrow P, the shiftable variable track guide 11 is moved closer to fixed track guide 1. In so doing, the first movable track section 21 swings in a counterclockwise direction around articulation 19. Because of the shift in the third track section 23, the fifth track section 31 swings in a counterclockwise direction; the fourth track section 29 shifts in an essentially parallel manner, again, in the direction of arrow P.

By this translational change in position, the two tracks (i.e., the fixed guide track 1 and the variable guide track 11, with guide tracks 8, 10 thereof) come to lie closer together. In the transfer region of the workpieces 5 (i.e., in the region of the second track section 21) this leads to a stretching of links 53, 55 of link chain 51 and, hence, to an increase in the distance a between pushers 3. At the same time, the distances a at the opposite side of the curve (i.e., in the track section 29 and 31, as illustrated in FIG. 4) decreases. In the described position of the third track section 23, screws 47, 49 now lie approximately in the middle of the slit-shaped recesses 43, 45, as shown in FIG. 5.

Figure 6:
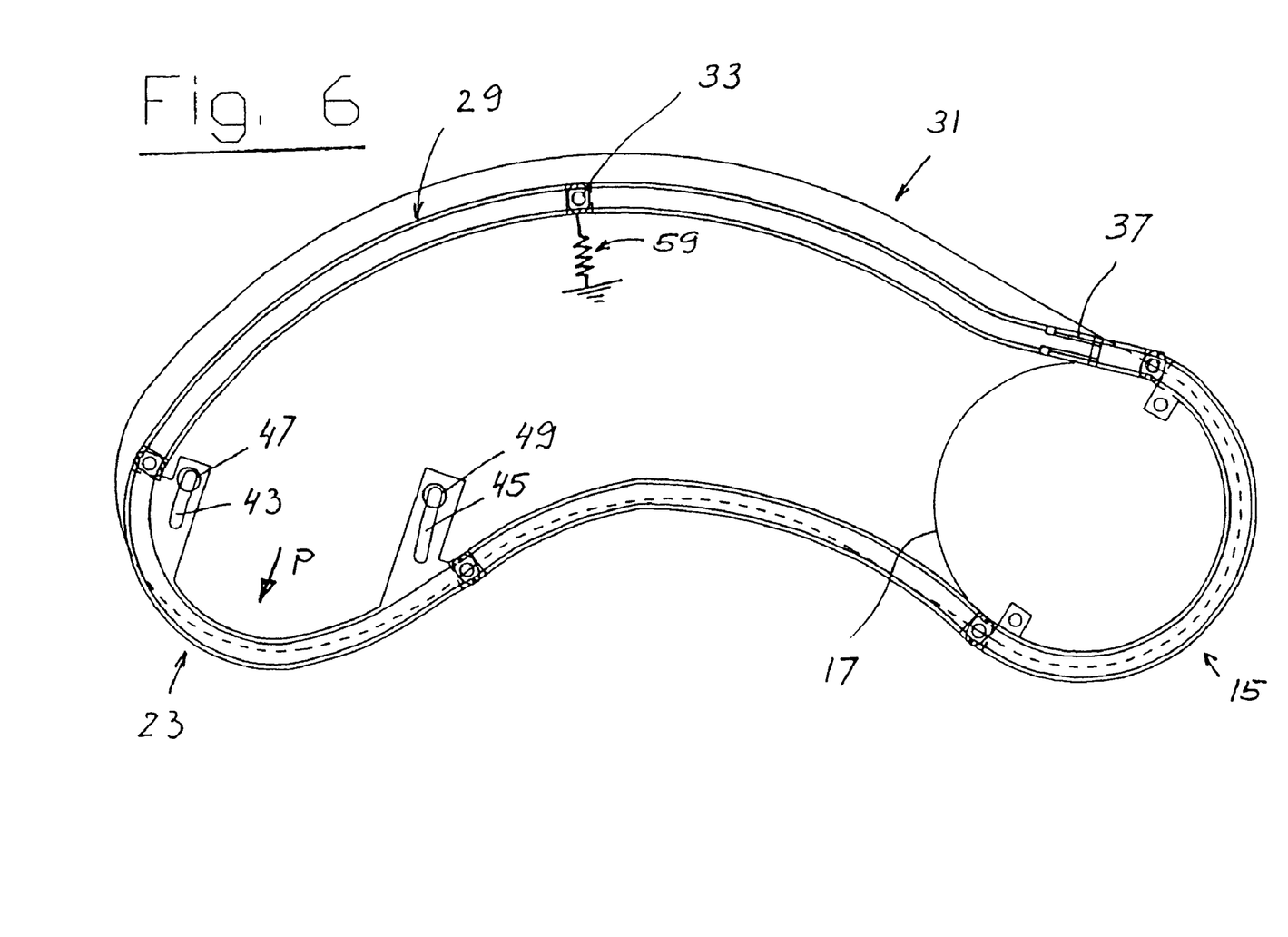
FIG. 6 is a top view of the curved, or variable, guide track in the position for large distances between the workpieces.
Figure 7:
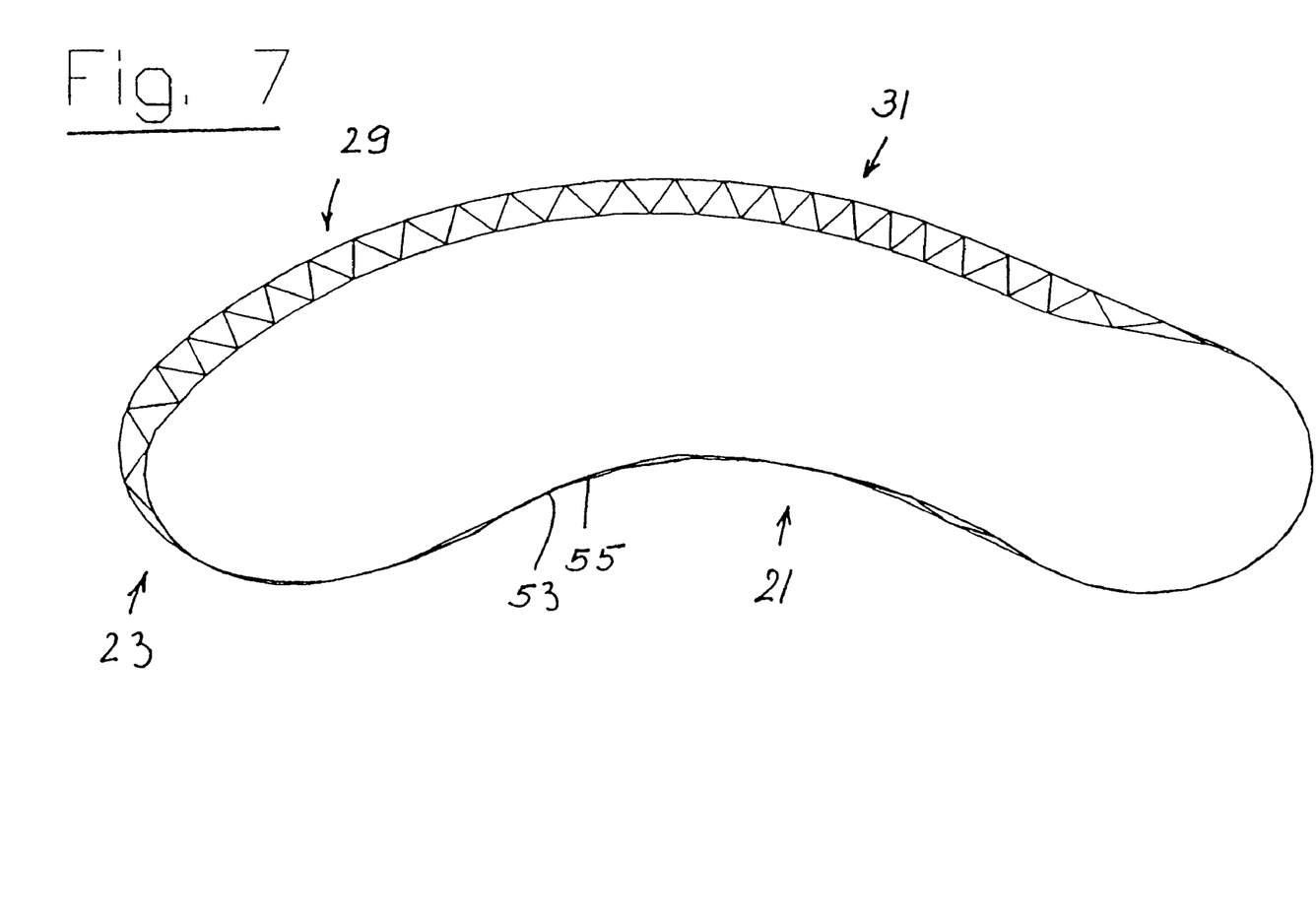
FIG. 7 is a top view on the position of the conveying chain in FIG. 6, in the case of large distances between the workpieces.

If the third track section 23 is further shifted in the direction of the arrow P (as shown in FIG. 6), until screws 47, 49 abut against the upper end of recesses 43, 45, the chain links 53, 55 in second track section 21 are brought to an approximately completely stretched position (see, FIG. 7). Consequently, the distance a between the individual pushers 3 is also brought to its maximum value. In contrast, the distance between the pushers 3, on the opposite side, in the region of the fourth and fifth track sections 29, 31, will diminish.

Inasmuch as the shifting of the third track section 23 and the swinging of the remaining movable track sections 21, 29, 31 cannot completely occur without changing the length of the entire movable variable guide track 11, one provides a sliding position 57 (e.g., within the fifth track section 31), which compensates for this change in length, which amounts to a few millimeters. Articulation 33, which connects the fourth and fifth track sections 29, 31, is pulled via a spring 59 against the inside of the variable guide track 11. This turns the variable guide track 11 into an essentially rigid construct.

Figure 8:
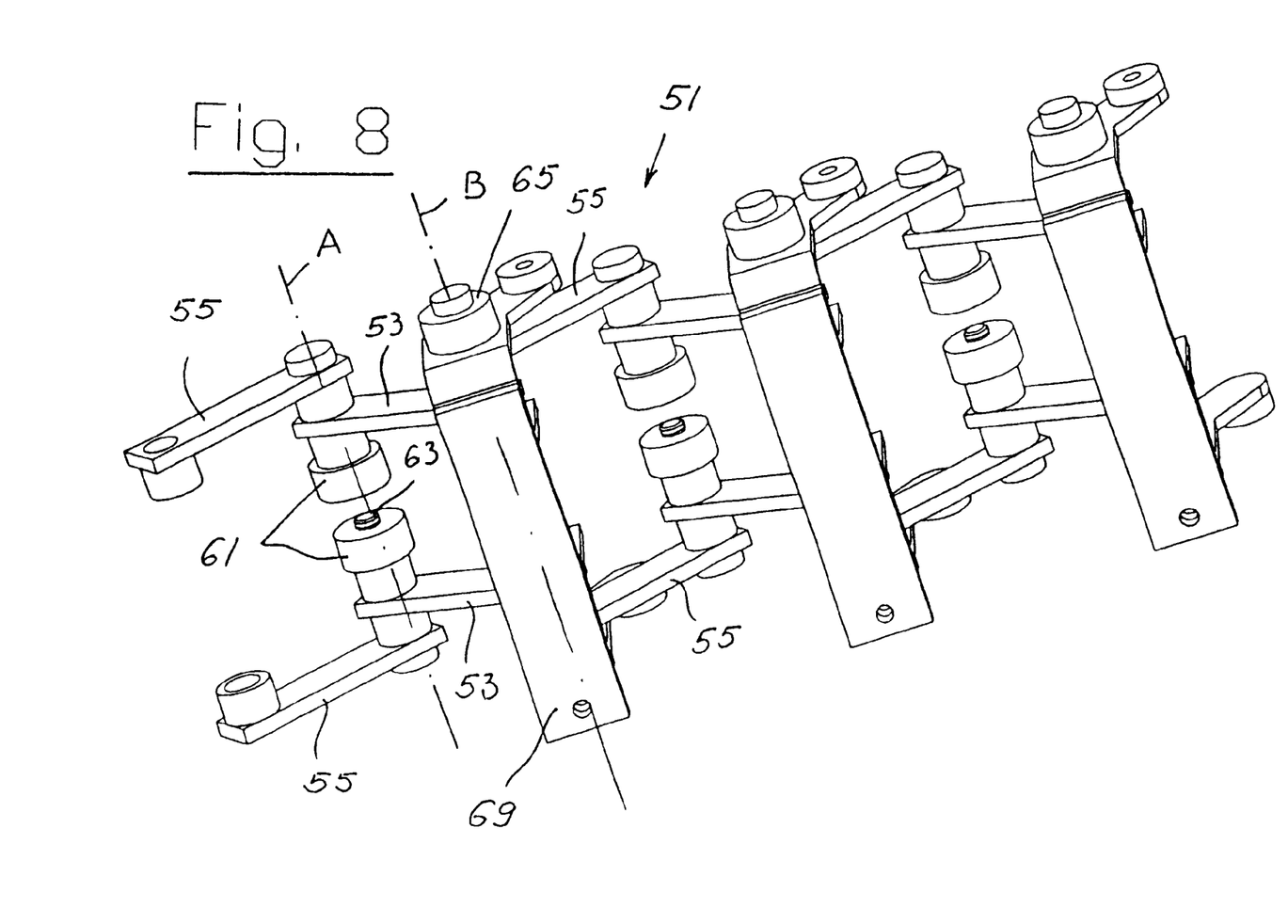
FIG. 8 is a perspective representation of a small number of chain links in the case of small distances between the workpieces on the pusher element side.
Figure 9:
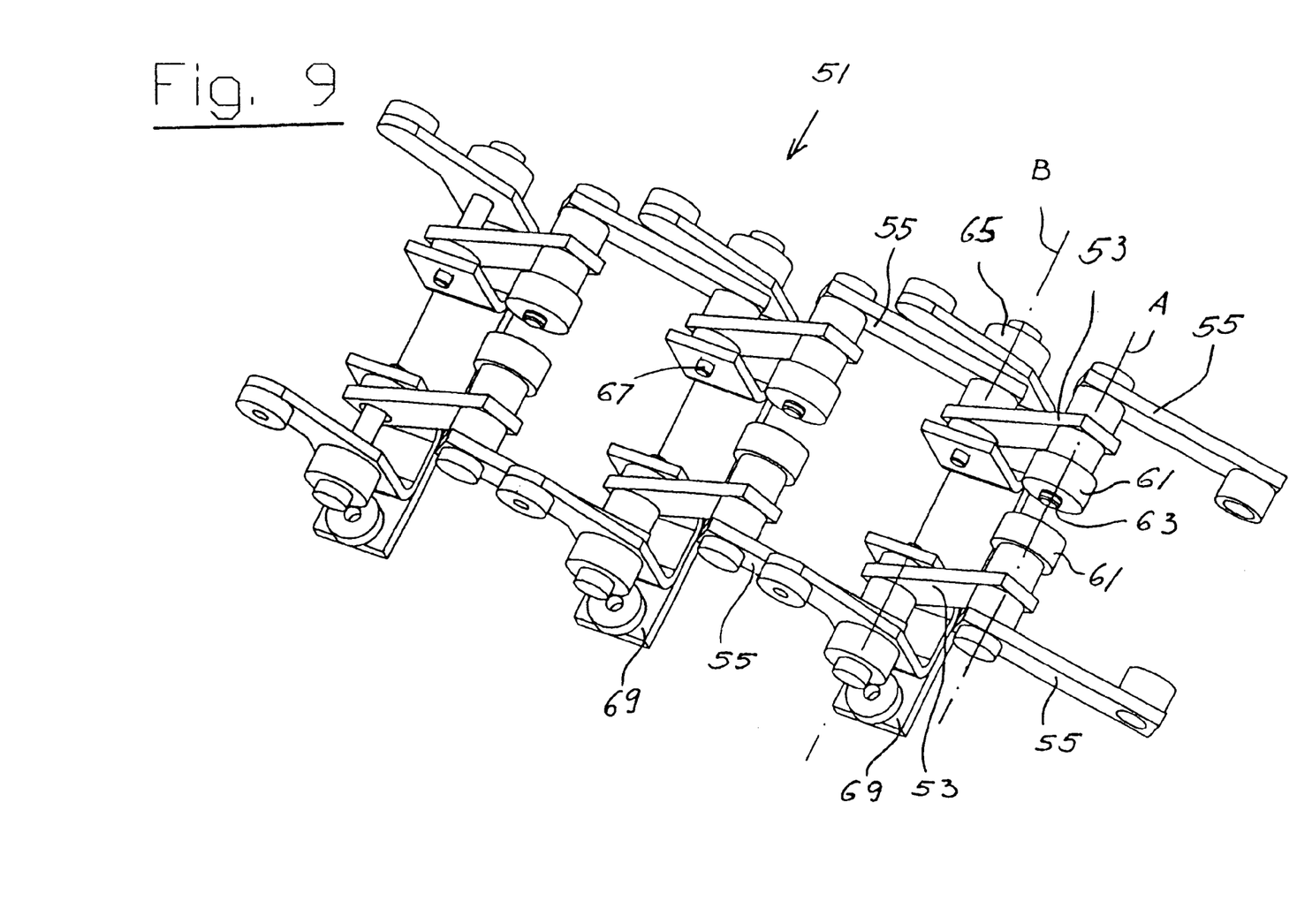
FIG. 9 is a perspective representation of the chain links in FIG. 8, seen from a rearward view; and, FIG. 10 is a perspective, sectional representation of two pusher elements, inserted between the top plate and the bottom plate.
Figure 10:
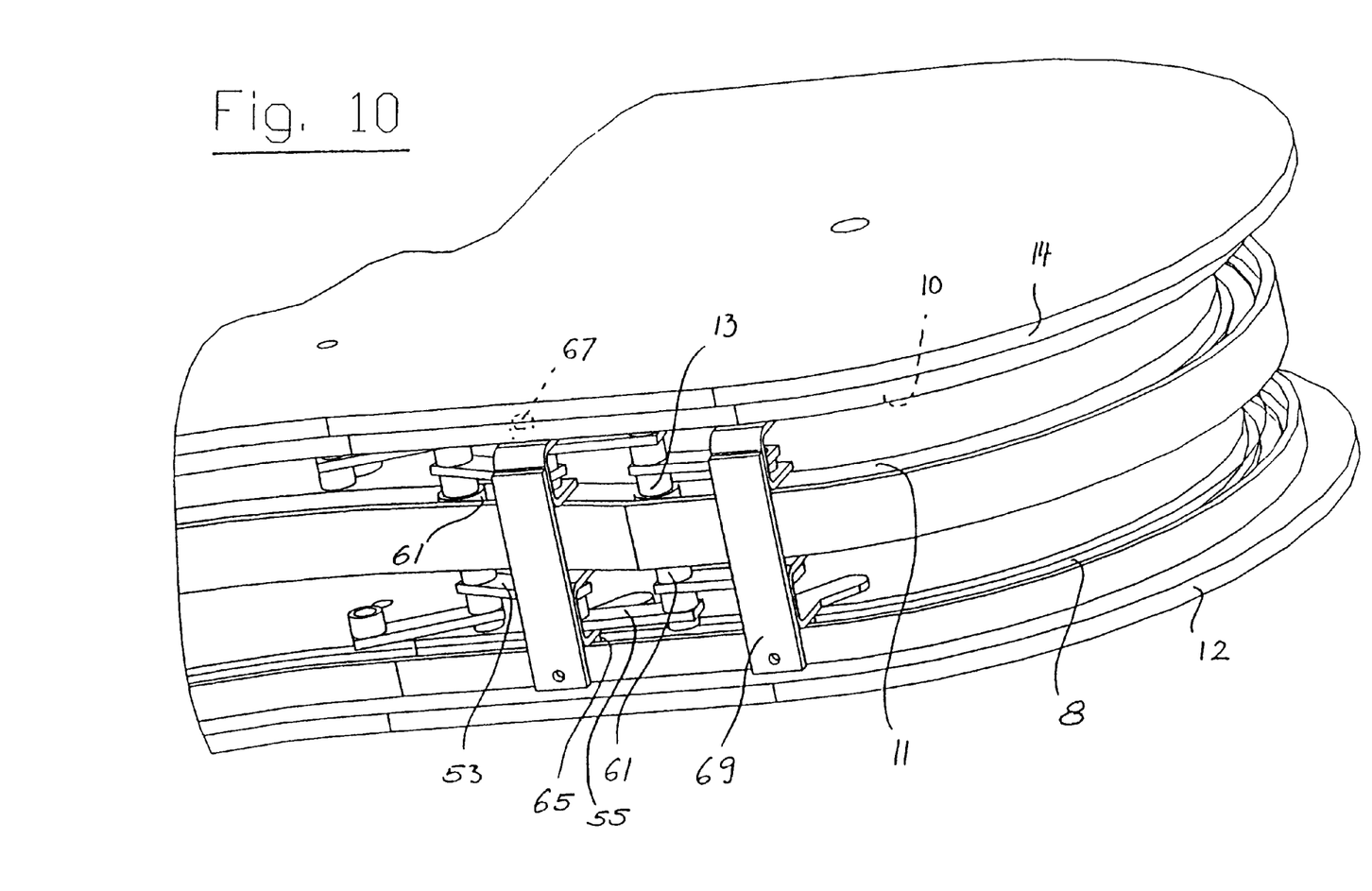

The variable guide track 11—and/or its rigid track section 15 and its movable track sections 21, 23, 29, 31— preferably, feature a double T-shaped cross-section. Into the cross-section, from the top and from the bottom, engage steering rollers 61, which are attached to shafts 63 in a manner capable of rotation around an axle A. Shafts 63 connect the chain link pairs 53, 55. Guide rollers 65 are carried in a rotatable fashion on a common axle B and are supported by axle journals 67, which connect the opposing ends of the chain links 53, 55. In addition, pushers 3 are attached to shafts 63, i.e., at the connecting plates 69 connect to each other, the two chains 51, which comprise chain links 53, 55, as illustrated in FIGS. 8 and 9. Guide rollers 65, on axles B, engage into guide grooves on the two fixed guide tracks 1.

The conveying apparatus of the present invention features a very simple structure and the distances a between consecutive workpieces 5 can be adjusted in a simple manner by shifting the third movable track section 23. This can be done via a spindle 71, which is driven manually or by a servomotor 73. The adjustment of the distances between the pushers 3 can be carried out in an infinitely variable manner and, if necessary, can occur during operation (cf. FIG. 2.)

What is claimed is:

1. A conveying apparatus for workpieces during a manufacturing procedure, comprising:
    a fixed guide track with a continuous conveyor chain having a plurality of pusher elements with distances between said pusher elements along said fixed guide track being adjustable, said fixed guide track being closed-onto-itself and on which guide rollers are guided on supporting axles for said plurality of pusher elements, said fixed track section being a first track section;
    a drive wheel for driving said continuous conveyor chain; and,
    a variable guide track for guiding intermediate axles with steering rollers, said variable guide track comprising a fixed track section and a plurality of shiftable track sections enveloping said drive wheel, with ends of said shiftable track sections being connected to each other and, via articulations, and being connected with said fixed track section, said plurality of shiftable track sections comprising a second track section, a third track section, a fourth track section and a fifth track section, with said first track section being connected, via an articulation, to said second track section, said second track section is connected to said third track section, said third track section is connected to said fourth track section and said fourth track section is connected to said fifth track section, with said fifth track section having one end which is connected to said first track section, thereby closing said variable guide track, with said second track section including means for allowing said third track section to be shiftable at substantially a right angle to a straight line connecting two ends of said third track section and with said third track section of said variable guide track including means for allowing said third track section to be shiftable in a substantially parallel manner.

2. The conveying apparatus according to claim 1, wherein said third track section is shiftable via a drive which is manually operable.

3. The conveying apparatus according to claim 1, wherein said third track section is shiftable via a drive which is operable via a motor.

4. The conveying apparatus according to claim 1, wherein at least one of said second track section, said fourth track section and fifth track section of said variable guide track includes a sliding region for compensating for changes in length of said variable guide track.

5. A conveying apparatus for workpieces during a manufacturing procedure, comprising:
    a fixed guide track with a continuous conveyor chain having a plurality of pusher elements with distances between said pusher elements along said fixed guide track being adjustable, said fixed guide track being closed-onto-itself and on which guide rollers are guided on supporting axles for said plurality of pusher elements, said fixed track section being a first track section;
    a drive wheel for driving said continuous conveyor chain; and,
    a variable guide track for guiding intermediate axles with steering rollers, said variable guide track comprising a fixed track section and a plurality of shiftable track sections enveloping said drive wheel, with ends of said shiftable track sections being connected to each other and, via articulations, and being connected with said fixed track section, said plurality of shiftable track sections comprising a second track section, a third track section, a fourth track section and a fifth track section, with said first track section being connected, via an articulation, to said second track section, said second track section is connected to said third track section, said third track section is connected to said fourth track section and said fourth track section is connected to said fifth track section, with said fifth track section having one end which is connected to said first track section, thereby closing said variable guide track, with at least one of said second track section, said fourth track section and fifth track section of said variable guide track including a sliding region for compensating for changes in length of said variable guide track.

6. The conveying apparatus according to claim 5, wherein said second track section of said variable guide track includes means for allowing said second track section to be shiftable at substantially a right angle to a straight line connecting two ends of said third track section.

7. The conveying apparatus according to claim 5, wherein said third track section is shiftable via a drive which is manually operable.

8. The conveying apparatus according to claim 5, wherein said third track section is shiftable via a drive which is operable via a motor.

9. A conveying apparatus for workpieces during a manufacturing procedure, comprising:
    a fixed guide track with a continuous conveyor chain having a plurality of pusher elements with distances between said pusher elements along said fixed guide track being adjustable, said fixed guide track being closed-onto-itself and on which guide rollers are guided on supporting axles for said plurality of pusher elements;
    a drive wheel for driving said continuous conveyor chain; and,
    a variable guide track for guiding intermediate axles with steering rollers, said variable guide track comprising a fixed track section and a plurality of shiftable track sections enveloping said drive wheel, with ends of said shiftable track sections being connected to each other and, via articulations, and being connected with said fixed track section, said variable guide track having a double T-shaped cross-section and being arranged between two grooves which form at least a part of said fixed guide track.

10. The conveying apparatus according to claim 9, further comprising steering rollers which engage with, and roll on, chain links of said continuous conveyor chain, with said chain links being connected to said pusher elements.

* * * * *